United States Patent
Maeda

(10) Patent No.: US 7,840,131 B2
(45) Date of Patent: Nov. 23, 2010

(54) PHOTOGRAPHIC APPARATUS

(75) Inventor: Hirokazu Maeda, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/538,895

(22) Filed: Aug. 11, 2009

(65) Prior Publication Data

US 2010/0040358 A1 Feb. 18, 2010

(30) Foreign Application Priority Data

Aug. 13, 2008 (JP) .............................. 2008-208555

(51) Int. Cl.
*G03B 7/26* (2006.01)
(52) U.S. Cl. ....................... 396/206; 396/266
(58) Field of Classification Search ................ 396/155, 396/159, 161, 166, 167, 201–203, 206, 266, 396/264
See application file for complete search history.

(56) References Cited

U.S. PATENT DOCUMENTS

| | | | | |
|---|---|---|---|---|
| 5,504,584 | A | * | 4/1996 | Soeda .......................... 386/120 |
| 5,555,071 | A | * | 9/1996 | Koenig et al. ................ 396/155 |
| 5,634,146 | A | * | 5/1997 | Goo ............................. 396/61 |
| 5,701,519 | A | * | 12/1997 | Fukuhara et al. .............. 396/48 |
| 2007/0077053 | A1 | * | 4/2007 | Yanagi ......................... 396/166 |
| 2007/0110417 | A1 | * | 5/2007 | Itokawa ........................ 396/52 |
| 2007/0133974 | A1 | * | 6/2007 | Murakami et al. ........... 396/157 |
| 2009/0245770 | A1 | | 10/2009 | Uenaka |
| 2009/0245771 | A1 | | 10/2009 | Uenaka |
| 2009/0245773 | A1 | | 10/2009 | Uenaka |
| 2009/0245774 | A1 | | 10/2009 | Uenaka |
| 2009/0251551 | A1 | | 10/2009 | Uenaka |

FOREIGN PATENT DOCUMENTS

JP 2004-258381 9/2004

OTHER PUBLICATIONS

English language Abstract of JP 2004-258381, Sep. 16, 2004.
U.S. Appl. No. 12/538,894 to Maeda, filed Aug. 11, 2009.
U.S. Appl. No. 12/538,897 to Maeda, filed Aug. 11, 2009.

* cited by examiner

*Primary Examiner*—W. B. Perkey
*Assistant Examiner*—Dennis Hancock
(74) *Attorney, Agent, or Firm*—Greenblum & Bernstein P.L.C.

(57) ABSTRACT

A photographic apparatus comprises a flash that flashes and a controller. The controller obtains information regarding state of charge of the flash when an operation for preparing a photographic operation is conducted before the photographic operation corresponding to fully depressing a release button, calculates a first time until the flash reaches a charged state where the flash can flash on the basis of the information, calculates a second time after fully depressing said release button, and determines whether the photographic apparatus performs the photographic operation using the flash after the second time has elapsed or the photographic apparatus aborts the photographic operation on the basis of a comparison between the second time and a threshold. The second time is a difference between the first time and an elapsed time from a time point when the first time is calculated.

5 Claims, 4 Drawing Sheets

PHOTOGRAPHIC APPARATUS

BACKGROUND OF THE INVENTION

1. Field of the Invention

The present invention relates to a photographic apparatus and in particular to the control of the photographic operation with flash.

2. Description of the Related Art

A photographic apparatus that performs a photographic operation with flash is proposed. Before the photographic operation with flash is performed in this photographic apparatus, charging the flash is performed. The photographic operation with flash is performed after the flash reaches a sufficiently charged state so that the flash can flash.

Japanese unexamined patent publication (KOKAI) No. 2004-258381 discloses a photographic apparatus that forecasts a discharged quantity of the flash on the basis of an elapsed time from the point when the flash was last in a fully charged state, determines whether the flash is still in the charged state, and then determines whether the flash should be charged.

However, when the flash is not in the charged state, the photographic operation with flash is not performed until the flash is returned to the charged state. Therefore, a delay of the commencement of the photographic operation with flash may occur.

SUMMARY OF THE INVENTION

Therefore, an object of the present invention is to provide a photographic apparatus that can perform the photographic operation with flash while diminishing the chances that the photographic operation will be aborted and also while diminishing the long delay of the commencement of the photographic operation.

According to the present invention, a photographic apparatus comprises a flash that flashes and a controller. The controller obtains information regarding state of charge of the flash when an operation for preparing a photographic operation is conducted before the photographic operation corresponding to fully depressing a release button, calculates a first time until the flash reaches a charged state where the flash can flash on the basis of the information, calculates a second time after fully depressing said release button, and determines whether the photographic apparatus performs the photographic operation using the flash after the second time has elapsed or the photographic apparatus aborts the photographic operation on the basis of a comparison between the second time and a threshold. The second time is a difference between the first time and an elapsed time from a time point when the first time is calculated.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
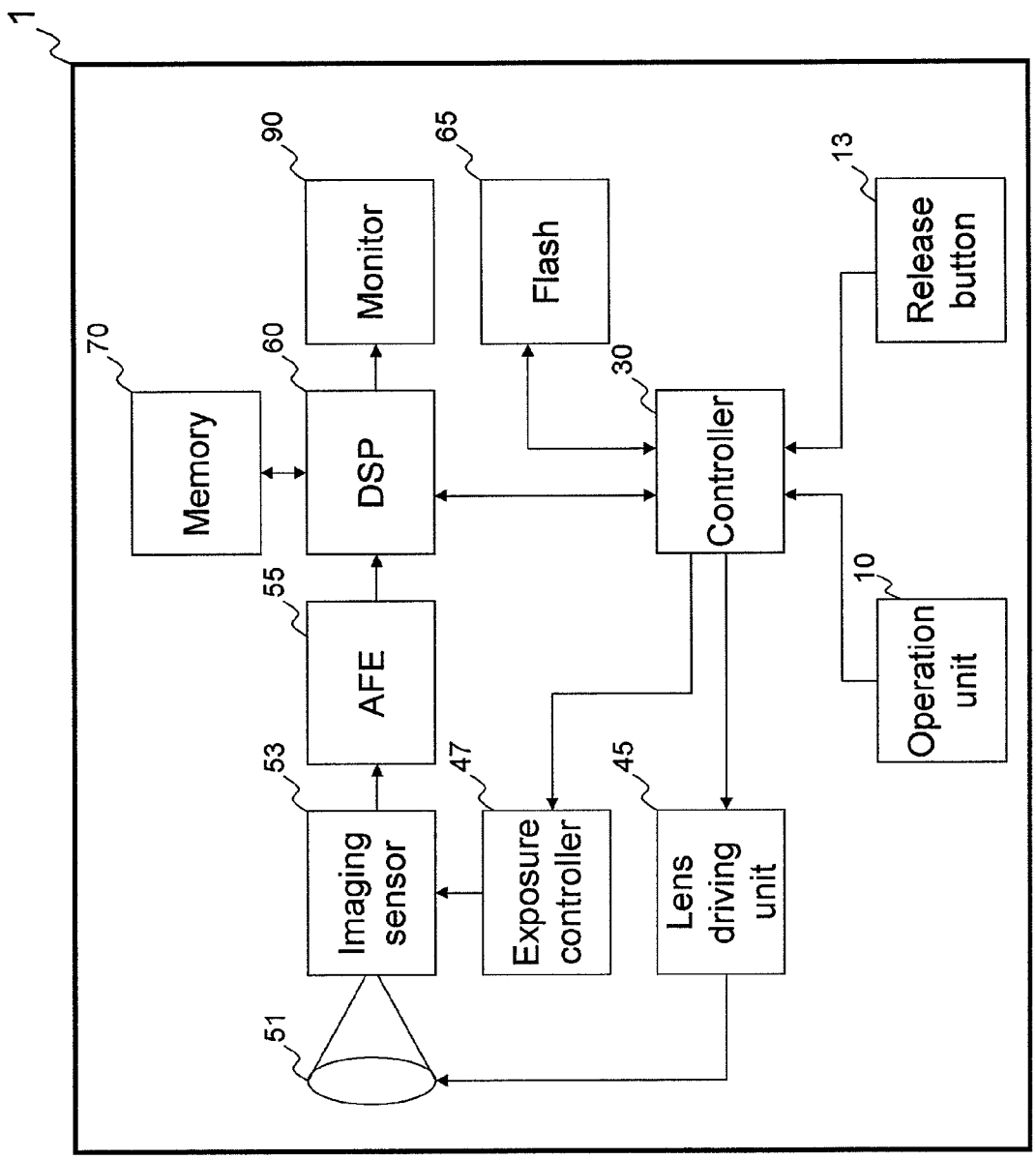
FIG. 1 is a block diagram of the photographic apparatus in the embodiment.

The present invention is described below with reference to the embodiment shown in the drawings In the embodiment, the photographic apparatus 1 is a digital camera.

The imaging part of the photographic apparatus 1 comprises an operation unit 10, a release button 13, a controller 30 that controls each part of the photographic apparatus 1, a lens driving unit 45, an exposure controller 47, a lens 51, an imaging sensor 53 such as a CCD etc., an AFE (Analog Front End) 55, a DSP (an image signal-processing circuit) 60, a flash 65, a memory 70, and a monitor 90 (see FIG. 1).

In the photographic operation, the photographic subject image is captured as an optical image through the lens 51 by the imaging sensor 53.

A/D conversion on the image data obtained by the photographic operation is performed by the AFE 55 and image-processing on the A/D-converted image data is performed by the DSP 60.

The operation unit 10 is used for setting use modes of the photographic apparatus 1.

As an example, consider that the operation unit 10 may be used for selecting a flash mode from among the plurality of use modes. Such flash mode may include one of: a Flash-On mode, (that discharges the flash 65 with each photographic operation); an Auto-Discharge mode, (that discharges the flash 65 automatically in dark or backlit locations, based on a photometric result); and a Flash-Off mode, (that does not discharge the flash 65 with each photographic operation). The flash mode is selected using the operation unit 10.

Furthermore, the operation unit 10 may be used for selecting a capture mode from among the plurality of use modes. In the capture mode, either the AE mode (including Program-AE mode) or the Manual mode is selected using the operation unit 10.

In the Program-AE mode (or the Auto-Picture mode), the exposure condition including the shutter speed, aperture, etc., is automatically calculated based on the photometric result.

Furthermore, as in the capture mode, the operation unit 10 is used to select a Picture mode and a Scene mode. The Picture mode is suitable for shooting a photographic subject image which includes a moving object. The Scene mode is suitable for shooting a photographic subject image that includes only minimal movement, such as a landscape etc.

When the release button 13 is partially depressed by the user, the photometric switch (not depicted) changes to the ON state so that the photometric operation is performed by an AE sensor (not depicted), and the AF sensing operation and the focusing operation are performed by the lens driving unit 45.

The photometric operation is performed on the basis of the image data obtained in the photographic operation by the imaging sensor 53.

Specifically, the DSP 60 calculates a luminance value (information regarding luminance of the photographic subject image) of a photometric area based on a luminance signal generated in the image processing. Then, the DSP 60 outputs it to the controller 30 as the photometric result.

The controller 30 calculates appropriate exposure values, including an aperture value and a shutter speed, on the basis of the calculated luminance value (calculation of exposure).

Furthermore, when the photographic apparatus 1 is set to the Auto-Discharge mode, the controller 30 determines whether it is necessary to discharge the flash 65 in the photographic operation on the basis of the calculated luminance value, in addition to the calculation of exposure.

When the flash mode of the photographic apparatus 1 is set to the Flash-On mode, first charging voltage V1 of the flash 65 is detected by the controller 30 in order to obtain information regarding the state of charge of the flash 65 after the release button 13 is partially depressed.

Then, a first time T1, which is the time period from a point when the release button 13 is partially depressed (or when the first charging voltage V1 is detected) to a point when the flash 65 reaches a sufficiently charged state so that the flash 65 can flash, is calculated.

Then, measuring an elapsed time Δ t and charging commence.

Similarly, when the capture mode of the photographic apparatus 1 is set to the AE mode and when the controller 30 determines that it is necessary to discharge the flash 65 in the photographic operation on the basis of the calculated luminance value, the first charging voltage V1 of the flash 65 is detected, the first time T1 is calculated, and measuring an elapsed time Δ t and charging commence, after the release button 13 is partially depressed.

The first time T1 is calculated on the basis of the first charging voltage V1 and a charge characteristic of the flash 65.

Figure 2:
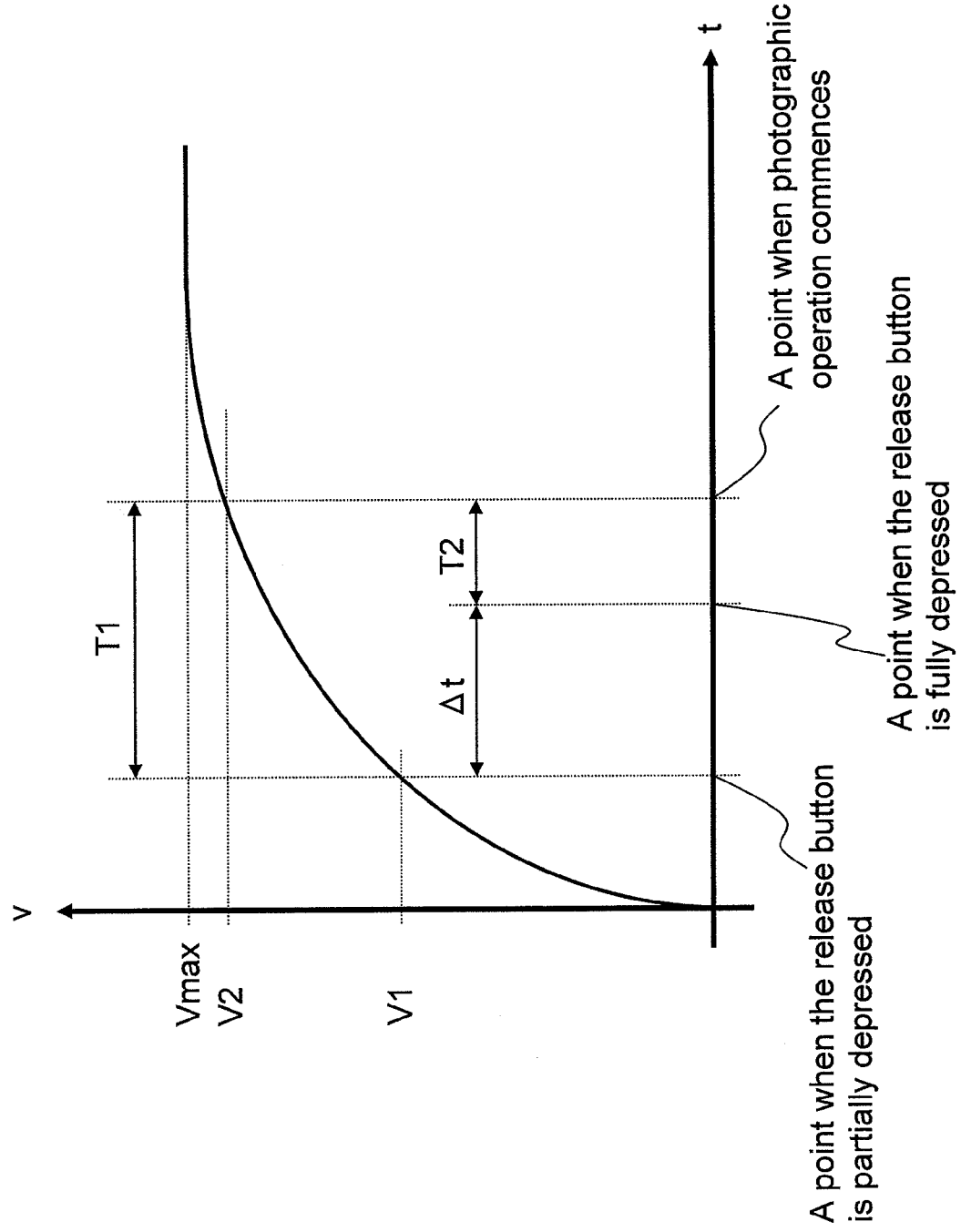
FIG. 2 is a graph showing a charge characteristic of the flash.

As shown in FIG. 2, the charge characteristic of the flash 65 is a relationship between charging voltage v and time t from uncharged state (v=0) to fully charged state (v=Vmax).

Specifically, on the basis of the first charging voltage V1 and the charge characteristic of the flash 65, the first time T1 is the length of time that is necessary to increase the charging voltage v from the first charging voltage V1 to the second charging voltage V2. The second charging voltage V2 corresponds to the charged state where the flash 65 can flash.

When the release button 13 is fully depressed by the user, the release switch changes to the ON state so that the photographic operation is performed with the exposure controller 47 controlling the aperture value and the shutter speed calculated by the controller 30.

In the Manual mode, the photographic operation is performed with the exposure controller 47 controlling the manually set aperture value and the manually set shutter speed.

The captured image corresponding to the image data is displayed on the monitor 90 and the image data is stored in the memory 70.

In the embodiment, an adjustment that delays commencement of the photographic operation or aborts the photographic operation may be performed.

Specifically, when the flash mode of the photographic apparatus 1 is set to the Flash-On mode, the controller 30 determines whether a second time T2 is less than or equal to a threshold Tsh after the release button 13 is fully depressed. The second time T2 is the difference between the first time T1 and the elapsed time Δ t. The elapsed time Δ t is an elapsed time from a point when the release button 13 is partially depressed to a point when the release button 13 is fully depressed.

Similarly, when the capture mode of the photographic apparatus 1 is set to the AE mode and when the controller 30 determines that it is necessary to discharge the flash 65 in the photographic operation on the basis of the calculated luminance value, the controller 30 then determines whether the second time T2 is less than or equal to the threshold Tsh after the release button 13 is fully depressed.

The threshold Tsh is set to a limit value so that the release time lag does not cause discomfort for the user, even if the commencement timing of the photographic operation is delayed for the threshold Tsh compared to the commencement timing that would normally occur in the commencement of the photographic operation after the release button 13 is fully depressed. The threshold Tsh is determined on the basis of experimental tests etc. For example, the threshold Tsh is set to 1 second.

When it is determined that the second time T2 is less than or equal to the threshold Tsh, the controller 30 performs the adjustment that delays commencement of the photographic operation with flash (the photographic operation using the flash 65) until the second time T2 has elapsed.

Otherwise, the controller 30 aborts the photographic operation and aborts flashing by the flash 65.

The threshold Tsh may be manually set by the user, or it may be automatically set set by the user in accordance with the capture mode etc.

For example, when the capture mode of the photographic apparatus 1 is set to the Picture mode etc., that is suitable for shooting the photographic subject image that includes a moving object, the threshold Tsh is set to a relatively small value.

On the other hand, when the capture mode of the photographic apparatus 1 is set to the Scene mode etc., that is suitable for shooting the photographic subject image that includes only minimal movement, such as a landscape etc., the threshold Tsh is set to a relatively large value.

Thus, the appropriate commencement timing of the photographic operation can be set in accordance with the capture mode by considering the speed of the moving object.

Figure 3:
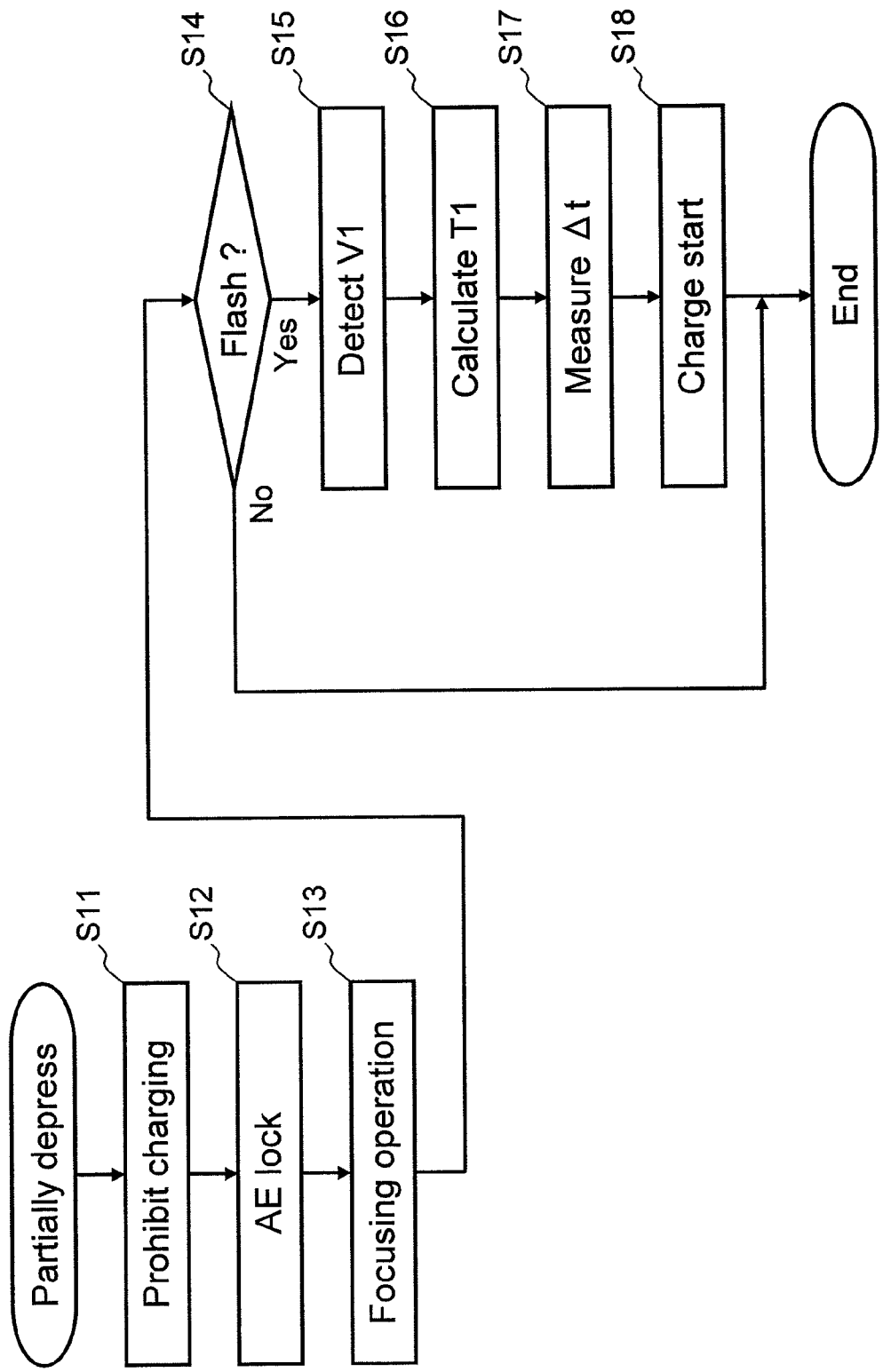
FIG. 3 is a flowchart that shows a process after partially depressing the release button.

Next, the process after the release button 13 is partially depressed is explained using the flowchart in FIG. 3.

When the release button 13 is partially depressed, the operation in step S11 commences. In step S11, charging is prohibited if charging of the flash 65 is being performed. This is because it is necessary to allocate power supply in order to drive the motor of the lens driving unit 45 for the focusing operation in step S13.

In step 12, the photometric operation is performed. After the calculation of exposure on the basis of the photometric result, an AE lock that fixes the aperture value and shutter speed set in the calculation of exposure is performed.

In step S13, the AF sensing operation and the focusing operation are performed by the lens driving unit 45. In step S14, first and second determinations are performed. In the first determination, it is determined whether the flash mode of the photographic apparatus 1 is set to the Flash-On mode. In the second determination, it is determined whether the capture mode of the photographic apparatus 1 is set to the AE mode, and whether it is necessary to discharge the flash 65 in the photographic operation on the basis of the photometric result.

When at least one of the first and second determinations is true so that the flash 65 flashes in the photographic operation, the operation continues to step S15. Otherwise, the operation is finished.

In step S15, the first charging voltage V1 of the flash 65 is detected by the controller 30. In step S16, the first time T1 is calculated on the basis of the first charging voltage V1 and the charge characteristic of the flash 65 by the controller 30. In step S17, measurement of the elapsed time Δ t commences. In step S18, charging the flash 65 commences (or restarts).

Figure 4:
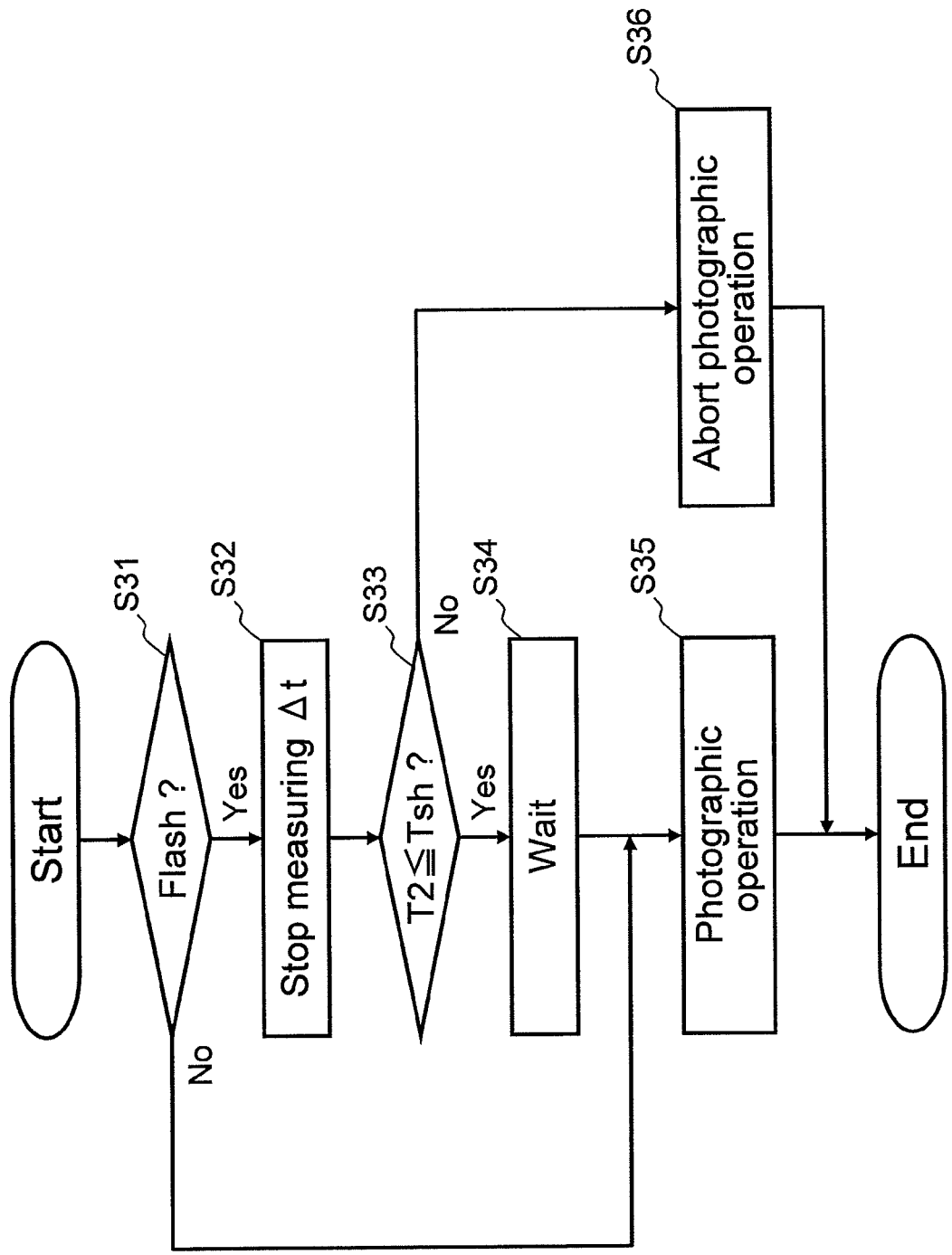
FIG. 4 is a flowchart that shows a process after fully depressing the release button.

Next, the process after the release button 13 is fully depressed is explained using the flowchart in FIG. 4.

When the release button 13 is fully depressed, the operation in step S31 commences. In step S31, the first and second determinations are performed. In the first determination, it is determined whether the flash mode of the photographic apparatus 1 is set to the Flash-On mode. In the second determination, it is determined whether the capture mode of the photographic apparatus 1 is set to the AE mode, and whether it is necessary to discharge the flash 65 in the photographic operation on the basis of the photometric result.

When at least one of the first and second determinations is true so that the flash 65 flashes in the photographic operation, the operation continues to step S32. Otherwise, the operation proceeds to step S35.

In step S32, measurement of the elapsed time $\Delta t$, which commenced in step S17 in FIG. 3, is stopped. In step S33, the second time T2, which is the difference between the first time T1 and the elapsed time $\Delta t$, is calculated by the controller 30. And then, the controller 30 determines whether the second time T2 is less than or equal to the threshold Tsh.

When it is determined that the second time T2 is less than or equal to the threshold Tsh, the operation continues to step S34. In this case, the charging voltage v of the flash 65 is greater than or equal to the second charging voltage V2 and the flash 65 has already been charged, or the charging voltage v of the flash 65 has been increased to a voltage level near the second charging voltage V2 so that there is only a relatively short time until the flash 65 reaches the charged state.

Otherwise, the operation proceeds to step S36. In this case, the charging voltage v of the flash 65 has not been increased to a voltage level near the second charging voltage V2, making for a relatively long time until the flash 65 reaches the charged state.

In step S34, waiting for the second time T2 from a point in step S33 is performed. Then in step S35, after the second time T2 has elapsed in step S34, the photographic operation with flash is performed.

In step S35 when both the first and second determinations are not true, the photographic operation without flash is performed.

After the photographic operation, the AE lock is unlocked.

In step S36, the photographic operation is aborted (is not performed), and then the AE lock is unlocked.

Furthermore, it is desirable to announce the abort to the user when the photographic operation is aborted. For example, an announcement of abort may be displayed on the monitor 90.

In the embodiment, when the second time T2, which is the time period from the time point when the release button 13 is fully depressed to the time point when the flash 65 reaches the charged state, is relatively short, a waiting control that delays the commencement of the photographic operation using the flash 65 until the flash 65 reaches the charged state, is performed.

When the second time T2 is relatively long, an aborting control that aborts the photographic operation is performed.

Thus, the photographic operation using the flash 65 can be performed, while diminishing the chances that the photographic operation will be aborted and also while diminishing the relatively long delay of the commencement of the photographic operation.

Furthermore, in the embodiment, it is explained that the calculation of the first time T1 is performed when the release button 13 is partially depressed, the second time T2 is calculated on the basis of the first time T1, and waiting or aborting the photographic operation is determined on the basis of the length of the second time T2.

However, this determination is not limited to the above described method.

For example, the information regarding the charging voltage v of the flash 65 may not be obtained after the release button 13 is partially depressed, but instead the charging voltage v of the flash 65 may be detected after the release button 13 is fully depressed. On the basis of this detected charging voltage v and the charge characteristic of the flash 65, a third time T3 is calculated. The third time T3 is the time period from the time point when the release button 13 is fully depressed to the time point when the flash 65 reaches the charged state. When the third time T3 is relatively short, the waiting control that delays the commencement of the photographic operation using the flash 65 until the third time T3 has elapsed is performed. When the third time T3 is relatively long, the aborting control that aborts the photographic operation is performed.

In this case, the photographic operation using the flash 65 can also be performed, while diminishing the chances that the photographic operation will be aborted and also diminishing the long delay of the commencement of the photographic operation.

However, the detection of the charging voltage v, and the calculation of the third time T3 are performed after the release button 13 is fully depressed. Therefore, the commencement of the photographic operation may be delayed because of these detection and calculation efforts, compared to the case when detection and calculation are performed before fully depressing the release button 13.

Furthermore, it is explained that the calculation of the first time T1 is performed when the release button 13 is partially depressed. However, this calculation may be performed when an operation that prepares the photographic operation is conducted before the photographic operation corresponding to fully depressing the release button 13. For example, this calculation may be performed when the photographic apparatus 1 is set to the ON state.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-208555 (filed on Aug. 13, 2008), which is expressly incorporated herein by reference, in its entirety.

The invention claimed is:

1. A photographic apparatus comprising:
    a flash that flashes; and
    a controller that obtains information regarding state of charge of said flash, that calculate a time until said flash reaches a charged state where said flash can flash on the basis of said information, and that determines whether said photographic apparatus performs an photographic operation using said flash after said time has elapsed or aborts said photographic operation on the basis of a comparison between said time and a threshold.

2. The photographic apparatus according to claim 1, wherein said threshold is set in accordance with capture mode of said photographic apparatus.

3. A photographic apparatus comprising:
    a flash that flashes; and
    a controller that obtains information regarding state of charge of said flash when an operation for preparing a photographic operation is conducted before said photographic operation corresponding to fully depressing a release button, that calculates a first time until said flash reaches a charged state where said flash can flash on the basis of said information, that calculates a second time after fully depressing said release button, and that determines whether said photographic apparatus performs said photographic operation using said flash after said second time has elapsed or said photographic apparatus aborts said photographic operation on the basis of a comparison between said second time and a threshold;

said second time being a difference between said first time and an elapsed time from a time point when said first time is calculated.

4. The photographic apparatus according to claim 3, wherein said threshold is set in accordance with capture mode of said photographic apparatus.

5. A method for determining a photographic operation of a photographic apparatus, comprising:

obtaining information regarding state of charge of a flash when an operation for preparing said photographic operation is conducted before said photographic operation corresponding to fully depressing a release button;

calculating a first time until said flash reaches a charged state where said flash can flash on the basis of said information;

calculating a second time that is a difference between said first time and an elapsed time from a time point when said first time is calculated after fully depressing said release button; and determining whether said photographic apparatus performs said photographic operation using said flash after said second time has elapsed or said photographic apparatus aborts said photographic operation on the basis of said second time.

* * * * *